(12) United States Patent
Oh et al.

(10) Patent No.: US 7,557,887 B2
(45) Date of Patent: Jul. 7, 2009

(54) LIQUID CRYSTAL DISPLAY AND FABRICATING METHOD THEREOF

(75) Inventors: Chang Ho Oh, Taegu-shi (KR); Su Woong Lee, Kyoungsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 348 days.

(21) Appl. No.: 10/026,782

(22) Filed: Dec. 27, 2001

(65) Prior Publication Data

US 2002/0085159 A1 Jul. 4, 2002

(30) Foreign Application Priority Data

Dec. 30, 2000 (KR) ............................... 2000-87050

(51) Int. Cl.
*G02F 1/1345* (2006.01)

(52) U.S. Cl. .................... 349/149; 349/150; 257/72; 257/E29.117

(58) Field of Classification Search ................ 349/152, 349/153, 151, 154, 155, 156, 139, 149, 150; 257/72, 59, 355
See application file for complete search history.

(56) References Cited

U.S. PATENT DOCUMENTS

| | | | | |
|---|---|---|---|---|
| 5,498,767 A | * | 3/1996 | Huddleston et al. ............ 716/12 |
| 5,499,131 A | * | 3/1996 | Kim ............................ 349/149 |
| 5,555,116 A | * | 9/1996 | Ishikawa et al. .............. 349/149 |
| 5,565,385 A | * | 10/1996 | Rostoker et al. .............. 438/614 |
| 5,737,053 A | * | 4/1998 | Yomogihara et al. ......... 349/149 |
| 5,951,304 A | * | 9/1999 | Wildes et al. .................. 439/67 |
| 6,052,169 A | * | 4/2000 | Kim ........................... 349/148 |
| 6,201,590 B1 | * | 3/2001 | Ohta et al. ................... 349/141 |
| 6,225,967 B1 | * | 5/2001 | Hebiguchi ..................... 345/88 |
| 6,362,032 B1 | * | 3/2002 | Kim et al. .................... 438/158 |
| 6,380,098 B1 | * | 4/2002 | Jeong et al. .................. 438/745 |
| 6,417,906 B2 | * | 7/2002 | Ohta et al. ................... 349/141 |
| 6,437,596 B1 | * | 8/2002 | Jenkins et al. ............... 324/770 |
| 6,524,876 B1 | * | 2/2003 | Baek et al. .................... 438/48 |
| 6,531,392 B2 | * | 3/2003 | Song et al. ................... 438/648 |
| 6,536,871 B1 | * | 3/2003 | Haddick et al. ................ 347/50 |
| 6,555,409 B2 | * | 4/2003 | Kim et al. ..................... 438/34 |
| 2001/0000439 A1 | * | 4/2001 | Ohta et al. ................... 349/141 |

FOREIGN PATENT DOCUMENTS

| | | | |
|---|---|---|---|
| JP | 03232274 | * | 10/1991 |
| JP | 06-051333 | | 2/1994 |
| JP | 2000-098414 | | 4/2000 |

* cited by examiner

*Primary Examiner*—Sue Purvis
*Assistant Examiner*—Fazli Erdem
(74) *Attorney, Agent, or Firm*—McKenna Long & Aldridge LLP

(57) ABSTRACT

A liquid crystal display device includes a plurality of liquid crystal cells on a substrate, a plurality of drive lines extending along first and second directions and connected to the plurality of liquid crystal cells, a plurality of pad lines extending from each of the plurality of drive lines at a first angle from one of the first and second directions, and a plurality of pads extending at the first angle and connected to each of the plurality of pad lines for supplying external drive signals.

7 Claims, 4 Drawing Sheets

LIQUID CRYSTAL DISPLAY AND FABRICATING METHOD THEREOF

The present invention claims the benefit of Korean Patent Application No. P2000-87050 filed in Korea on Dec. 30, 2000, which is hereby incorporated by reference.

BACKGROUND OF THE INVENTION

1. Field of the Invention

The present invention relates to a liquid crystal display device, and more particularly to a liquid crystal display device and a fabricating method thereof.

2. Description of the Related Art

In general, a liquid crystal display (LCD) controls light transmissivity of a matrix array pattern of liquid crystal cells in response to video signals, thereby displaying image data (pictures) corresponding to the video signals on a liquid crystal display panel. Accordingly, the LCD includes a liquid crystal display panel having liquid crystal cells arranged in an active matrix type, and driving integrated circuits (IC's) for driving the liquid crystal cells.

The driving IC's are usually manufactured in chip form. The driving IC's are mounted on a tape carrier package (TCP) in case of a tape automated bonding (TAB) system and on a surface of a liquid crystal display panel in case of a chips-on-glass (COG) system. The driving IC's are connected with the corresponding signal lines that are disposed in a pixel area through electrode pads provided within the TCP and the liquid crystal display panel to supply driving signals. The electrode pad is electrically connected with a corresponding signal line in the pixel area through a pad line.

In the liquid crystal display, a number of pixels disposed between adjacent pad lines is increased, thereby achieving a high resolution picture. Accordingly, the pad line that is connected between the electrode pad and the corresponding signal line in the pixel area is set to have a length that is different from adjacent pad lines in accordance with the location, as shown in FIG. 1.

In FIG. 1, a conventional liquid crystal display device includes a plurality of pixels 52 formed in a pixel area, a gate pad part 54 connected with a gate driving circuit 57 for supplying signals to the pixels 52, and a gate pad line 58 formed at an angle for connecting the pixels 52 with the gate pad part 54. The pixels 52 display image data (pictures) in accordance with a corresponding signal supplied from a corresponding gate pad line 58.

A plurality of gate electrode pads 59 are formed in the gate pad part 54 for supplying a gate signal to the plurality of gate lines GL in the pixel area. The gate electrode pads 59 are disposed at an edge of a lower substrate 51 and are formed in a direction perpendicular to a panel edge 56 of the lower substrate 51. Accordingly, the gate pad part 54 is electrically connected with a gate TCP 55 through the gate electrode pads 59. A plurality of signal pads (not shown) are formed in a direction corresponding to the gate electrode pads 59 and are electrically connected with the gate electrode pads 59 along one side of the gate TCP 55. The gate pad line 58 electrically connects the gate electrode pads 59 with the corresponding pixels 52. The gate pad line 58 is wired at an angle with a fixed gradient for connecting the corresponding pixels 52 with the gate electrode pads 59 disposed in a direction perpendicular to the panel edge 56 of the lower substrate 51. Accordingly, the pixels 52 in the pixel area receive the gate signal that is supplied from the gate driving circuit 57, through a signal pad (not shown), the gate electrode pads 59 and the gate pad line 58.

Since the gate pad part 54 of the liquid crystal display device is disposed in a group in a direction perpendicular to the panel edge 56 of the lower substrate 51, line resistance between adjacent gate pad lines 58 is unequal. Accordingly, the gate signals applied to the gate lines GL in the pixel area are distorted, thereby deteriorating picture quality. The line resistance difference between the gate pad lines 58 occurs in the same way at a data pad line between the data line DL of the pixel area and the data electrode pad (not shown) connected to the data driving circuit. Accordingly, the data signals applied to the data lines DL in the pixel area are distorted due to differences in the line resistance difference between adjacent data pad lines, thereby deteriorating picture quality.

Such conventional liquid crystal display devices, particularly in the case of a high precision/high resolution such as a UXGA (where the number of pixels is 1600×1200), require more space since more lines are disposed in the limited pad width upon the pad line. Accordingly, the panel size is inevitably increased.

SUMMARY OF THE INVENTION

Accordingly, the present invention is directed to a liquid crystal display device and fabricating method thereof that substantially obviates one or more of the problems due to limitations and disadvantages of the related art.

An object of the present invention is to provide a liquid crystal display device and a fabricating method thereof having an increased number of conductive lines in a limited pad width.

Another object of the present invention is to provide a liquid crystal display device and a fabricating method thereof having a uniform line resistance between adjacent gate lines and data lines.

Another object of the present invention is to provide a liquid crystal display device and a fabricating method thereof for preventing deterioration of picture quality.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device includes a plurality of liquid crystal cells on a substrate, a plurality of drive lines extending along first and second directions and connected to the plurality of liquid crystal cells, a plurality of pad lines extending from each of the plurality of drive lines at a first angle from one of the first and second directions, and a plurality of pads extending at the first angle and connected to each of the plurality of pad lines for supplying external drive signals.

In another aspect, a method of fabricating a liquid crystal display device having a matrix array of liquid crystal cells includes forming a drive line to extend along a first direction on a substrate, forming a pad line to extend from the drive line at a first angle from the first direction, forming a pad to extend at the first angle and connected to the pad line, forming an insulating film material on the substrate to cover the pad line and the pad, forming a contact hole in the insulating film to expose the pad, and forming an electrode pattern on the insulating film to connect to the pad through the contact hole.

In another aspect, a liquid crystal display device includes a substrate, a plurality of orthogonal drive lines on the substrate, a plurality of pads extending at a first acute angle from an edge of the substrate, and a plurality of pad lines extending at the first angle and interconnected between each of the plurality of orthogonal drive lines and pads.

In another aspect, a method of fabricating a liquid crystal display device includes forming a plurality of drive lines to extend along first and second directions on a substrate, forming a plurality of pad lines to extend from the plurality of drive lines at a first acute angle from an edge of the substrate, forming a plurality of pads to extend at the first acute angle and connect to the plurality of pad lines, forming an insulating film material on the substrate to cover the plurality of pad lines and the plurality of pads, forming a plurality of contact holes in the insulating film to expose the plurality of pads, and forming an electrode patterns on the insulating film to connect to the plurality of pads through the plurality of contact holes.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

FIGS. 2A to 2E are cross sectional views representing steps of an exemplary method of fabricating a liquid crystal display according to the present invention.

Figure 1:
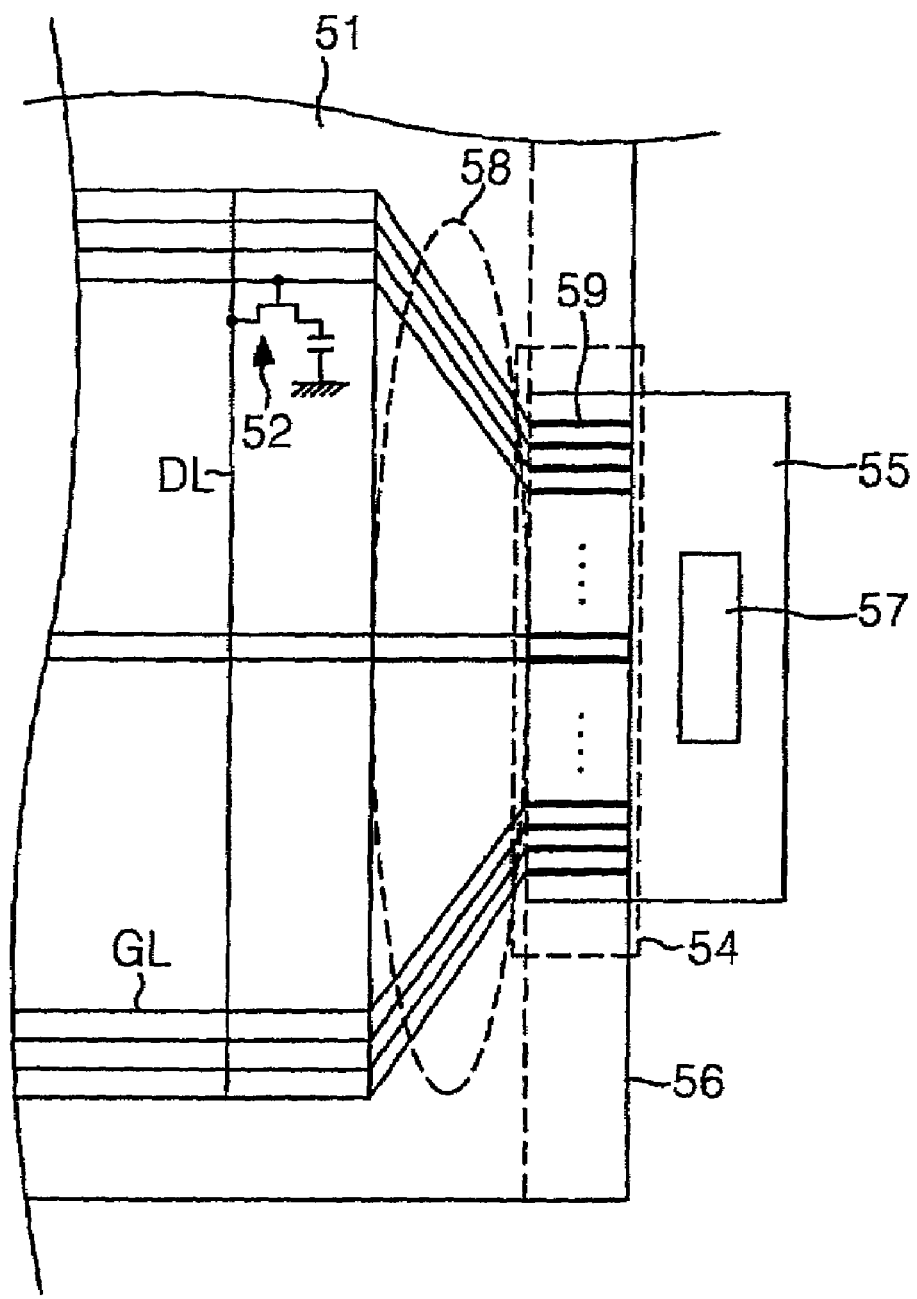
FIG. 1 shows a pad line of a conventional liquid crystal display device.
Figure 2A:
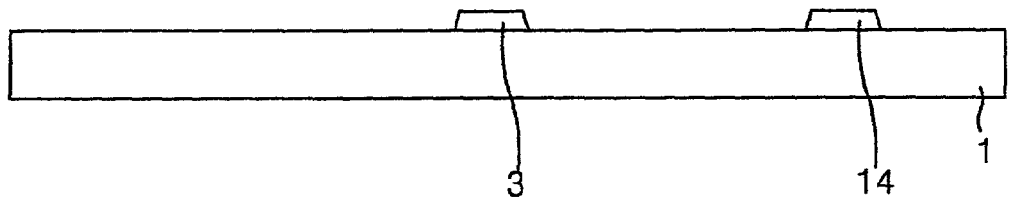
FIGS. 2A to 2E are cross sectional views showing an exemplary method of fabricating a liquid crystal display according to the present invention.

In FIG. 2A, aluminum(Al) or copper(Cu), for example, may be deposited on a lower substrate 1 by a sputtering technique, for example, to form a metal thin film (not shown). The metal thin film may be patterned by photolithographic and wet etching processes, for example, to form a gate electrode 3 and a gate pad electrode 14 on the lower substrate 1. The gate pad electrode 14 may be connected to a gate line GL (not shown) through a gate pad line (described below) and formed at an angle according to the location of the gate line GL. More specifically, the gate pad electrode 14 and the gate pad line (described below) may be formed with a large angle when a gate line is located at an upper or lower part of a panel, and may be formed with a small angle when a gate line is located at, or near a center part of the panel.

Figure 2B:
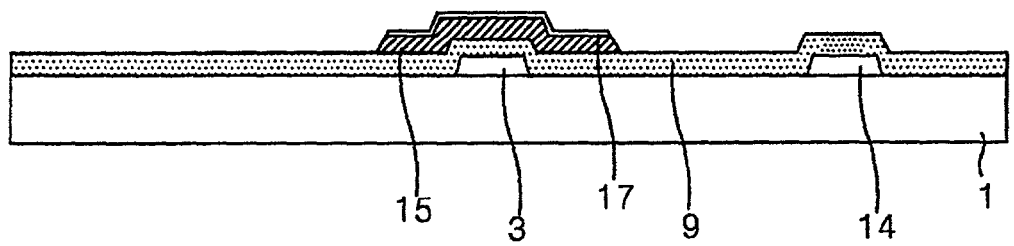

In FIG. 2B, a gate insulating film 9, an active layer, and an ohmic contact layer may be sequentially formed on the lower substrate 1 by a chemical vapor deposition process, for example, to cover the gate pad electrode 14 and the gate electrode 3. The gate insulating film 9 may be formed by depositing an insulating material of silicon nitride or silicon oxide, for example, and the active layer may be formed of undoped amorphous silicon or polycrystalline silicon, for example. In addition, the ohmic contact layer may be formed of amorphous silicon or polycrystalline silicon, for example, to which N-type or P-type impurities are introduced at high concentration. The ohmic contact layer and the active layer may be patterned by a photolithographic and anisotropic etching processes, for example, to form an ohmic contact layer 17 and an active layer 15 on a portion of the gate insulating film 9 corresponding to the gate electrode 3.

Figure 2C:
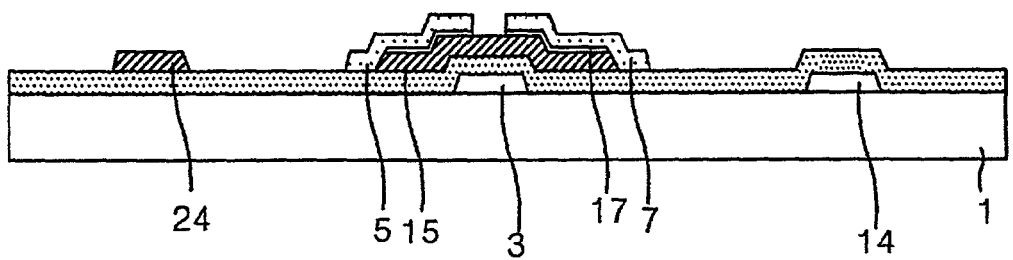

In FIG. 2C, molybdenum (Mo) or a molybdenum alloy including MoW, MoTa, and MoNb, for example, may be deposited on the gate insulating film 9 to cover the ohmic contact layer 17 by chemical vapor deposition or sputtering processed, for example. The deposited metal or metal alloy makes an ohmic contact with the ohmic contact layer 17. The metal or metal alloy may be patterned by a photolithographic process, thereby forming a source electrode 5 and a drain electrode 7. In addition, a data pad electrode 24 may be connected to a data line DL (not shown) through a data pad line (described below), and formed at an angle in accordance with a location of the data line DL (not shown). While patterning the source and drain electrodes 5 and 7, a portion of the ohmic contact layer 17 corresponding to the gate electrode 3 located between the source and drain electrodes 5 and 7 is also patterned, thereby exposing a portion of the active layer 15 that will become a channel.

Figure 2D:
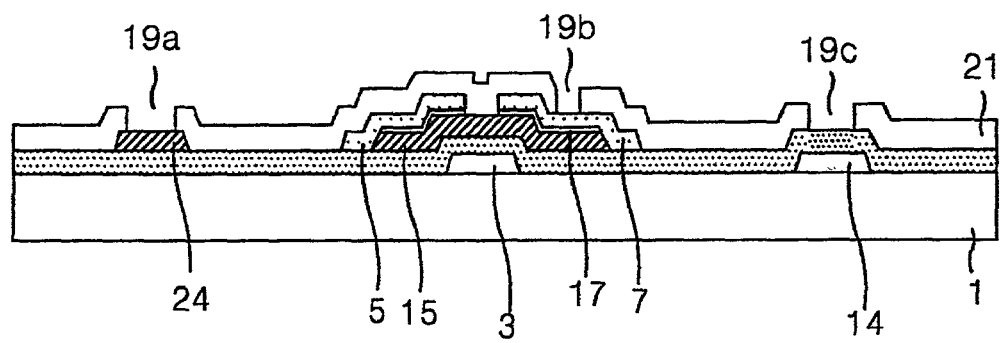

In FIG. 2D, an inorganic insulating material such as silicon nitride (SiNx) and silicon oxide, for example, or an organic insulating material, having a small dielectric constant, such as an acrylic organic compound, Teflon7, benzocyclobutene (BCB), Cytop7, and perfluorocyclobutane (PFCB), for example, may be deposited on the gate insulating layer 9 to cover the gate pad electrode 14, the data pad electrode 24, and the source and drain electrodes 5 and 7, thereby forming a protective layer 21. The protective layer 21 may be patterned by a photolithographic process, for example, to expose portions of the drain electrode 7, the gate pad electrode 14, and the data pad electrode 24, thereby forming first to third contact holes 19a, 19b, and 19c.

Figure 2E:
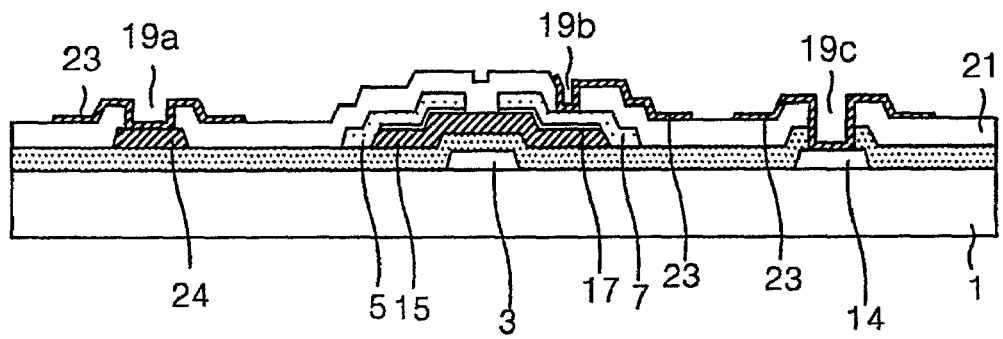

In FIG. 2E, transparent conductive material such as indium-tin-oxide(ITO), indium-zinc-oxide(IZO), and indium-tin-zinc-oxide(ITZO), for example, may be deposited on the protective layer 21 to form a pixel electrode 23 on the protective layer 21. The pixel electrode 23 may electrically contact the data pad electrode 24 through the first contact hole 19a, the drain electrode 7 through the second contact hole 19b, and the gate pad electrode 14 through the third contact hole 19c. The data pad electrode 24 may be connected to a data line (not shown) of a pixel area through a data pad line (not shown) contacting the first contact hole 19a. The gate pad electrode 14 may be connected to the gate line (not shown) of the pixel area through a gate pad line (not shown) contacting the third contact hole 19c.

Figure 3:
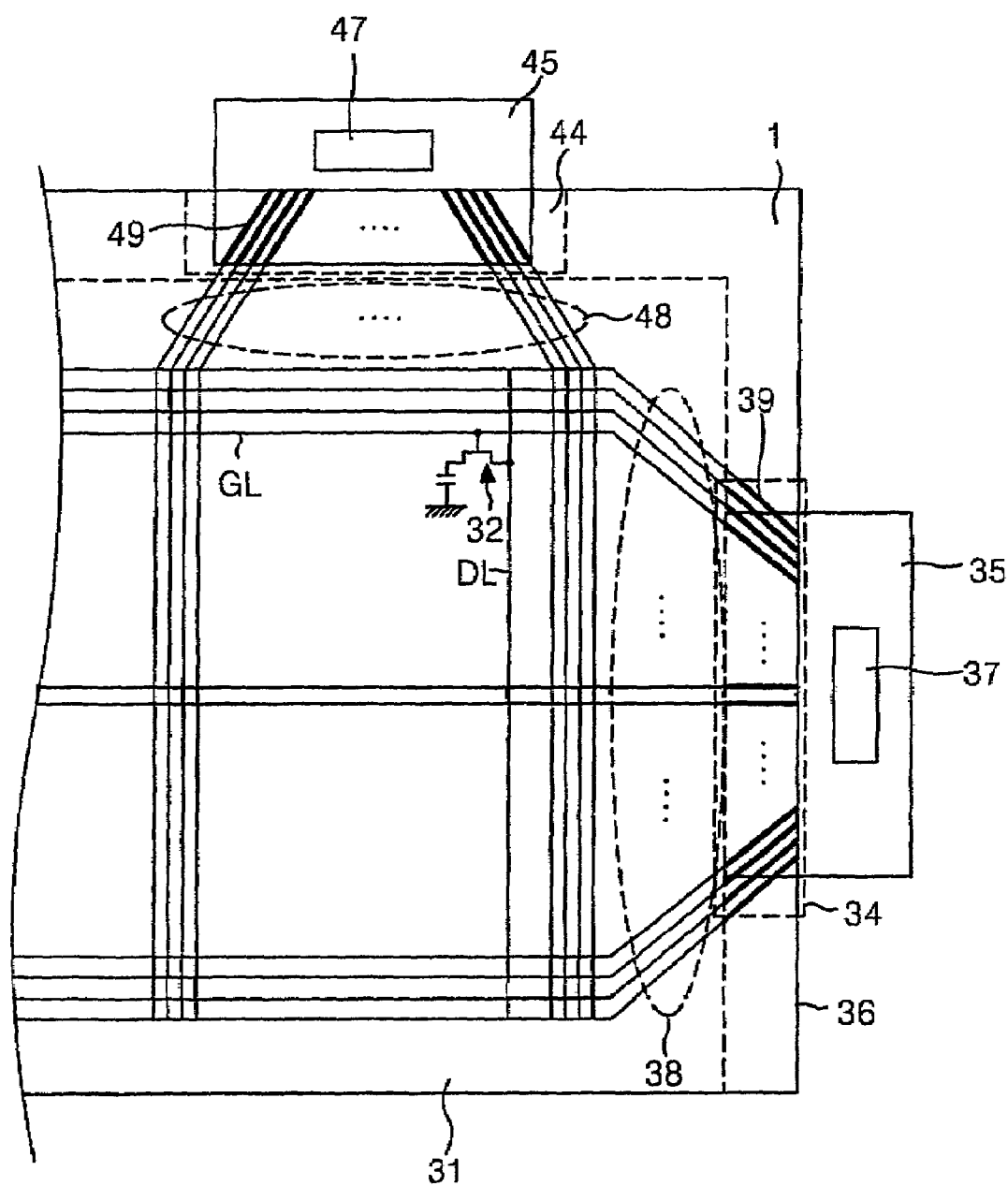
FIG. 3 shows an exemplary pad line of a liquid crystal display device according to the present invention.

FIG. 3 shows an exemplary pad line of a liquid crystal display device according to the present invention for connecting the gate line GL with the gate pad electrode 14 (in FIG. 2E) and the data line DL with the data pad electrode 24 (in FIG. 2E) in the pixel area.

In FIG. 3, a liquid crystal display device may include pixels 32 formed in a pixel area 31, an angled gate pad part 34 connected with a gate driving circuit 37 for supplying gate signals to the pixels 32, and an angled gate pad line 38 for connecting the gate pad part 34 to the pixels 32. The pixels 32 display image data (a picture) in response to gate signals supplied from corresponding gate pad lines 38.

A plurality of gate electrode pads 39 may be formed in the gate pad part 34 for supplying the gate signals to a plurality of gate lines GL of the pixel area 31. The gate electrode pads 39 may be disposed at an edge of the lower substrate 1 corresponding to a location of the gate line GL of the pixel area 31. Specifically, the gate pad electrode 14 and the gate pad line (not shown) may be formed at a relatively large angle in a case where a gate line GL is located at an upper or lower part of a display panel, and may be formed at a relatively small angle in a case wherein a gate line GL is located at, or near a center portion of the display panel. Consequently, the gate pad part 34 may be connected to a gate TCP 35 through the gate electrode pads 39.

A plurality of gate signal pads (not shown) may be formed along a direction corresponding to the gate electrode pads 39 and may electrically contact the gate electrode pads 39. In other words, the gate signal pads (not shown) may be formed at an angle equal to the angle of the gate electrode pads 39 for preventing a short circuit between adjacent gate electrode pads 39. The gate pad lines 38 connect the gate electrode pads 39 to corresponding pixels 32 for supplying the gate signals through the gate electrode pads 39 of the gate pad part 34. The gate pad lines 38 may be formed parallel to the direction of the gate electrode pads 39. Thus, the pixels 32 receive the gate signals from the gate driving circuit 37.

In FIG. 3, the liquid crystal display device may include a data pad part 44 connected to a data driving circuit 47 for supplying data signals to the pixels 32, and an angled data pad line 48 for connecting the data pad part 44 to the pixels 32.

A plurality of data electrode pads 49 may be formed for supplying the data signals to the data lines DL that are connected to the pixels 32. The data electrode pads 49 may be formed having different angles according to a location of the data lines DL within the pixel area 31. Specifically, the data electrode pads 49 and the data pad lines 48 may be formed at a relatively large angle in a case where the data lines DL are located at side parts of the display panel, and may be formed at a relatively small angle in a case where the data line DL are located at, or near a center portion of the display panel. Accordingly, the data pad part 44 may be connected with a data TCP 45 through the data electrode pads 49.

A plurality of data signal pads (not shown) may be formed along a direction corresponding to the data electrode pads 49 at one side of the data TCP 45 and electrically contact the data electrode pads 49. That is, the data signal pads (not shown) may be formed at an angle equal to the angle of the data electrode pads 49 for preventing a short circuit between adjacent data electrode pads 49. The plurality of data pad lines 48 connect the data electrode pads 49 to corresponding pixels 32 for supplying data signals through the data electrode pads 49 of the data pad part 44. The data pad lines 48 may be formed parallel to the direction of the data electrode pads 49. Thus, the pixels 32 receive the data signals from the data driving circuit 47.

It will be apparent to those skilled in the art that various modifications and variations can be made in the liquid crystal display device and a fabricating method thereof of the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
a plurality of liquid crystal cells on a substrate;
a plurality of first drive lines extending along a first direction and connected to the plurality of liquid crystal cells;
a plurality of second drive lines extending along a second direction and connected to the plurality of liquid crystal cells;
a plurality of first pad lines extending from the plurality of first drive lines at first angles from the first direction;
a plurality of second pad lines extending from the plurality of second drive lines at second angles from the second direction;
a plurality of first pads, each extending at the same angle as the angle of the corresponding first pad line and connected to the corresponding first pad line for supplying external drive signals; and
a plurality of second pads, each extending at the same angle as the angle of the corresponding second pad line and connected to the corresponding second pad line for supplying external drive signals,
wherein the first pads and the first pad lines are formed at relatively large angles in a case where the first drive lines are located at an upper or lower part of a first driving circuit, and
wherein the first plurality of drive lines include gate lines and a plurality of second drive lines include data lines.

2. The device according to claim 1, further includes a tape carrier package having a signal pad extending at the first angle and electrically contracting the plurality of first pads.

3. The device according to claim 2, further includes the driving circuit mounted on the tape carrier package for supplying the external drive signals.

4. A liquid crystal display device, comprising:
a substrate;
a plurality of orthogonal drive lines on the substrate;
a plurality of pads extending at a first acute angle from an edge of the substrate; and
a plurality of pad lines extending at the first acute angle and interconnected between each of the plurality of orthogonal drive lines and pads,
wherein the pads and the pad lines are formed at relatively large angles in a case where the drive lines are located at an upper or lower part of a driving circuit, and
wherein the plurality of orthogonal drive lines include gate lines and data lines.

5. The device according to claim 4, wherein the plurality of pads extending at the first angle are disposed at the edge of the substrate.

6. The device according to claim 4, further includes a tape carrier package having a signal pad extending at the first angle and electrically contacting the plurality of pads.

7. The device according to claim 6, further includes the driving circuit mounted on the tape carrier package for supplying external drive signals to the plurality of drive lines.

* * * * *